(12) United States Patent
Mayes

(10) Patent No.: US 7,255,307 B2
(45) Date of Patent: Aug. 14, 2007

(54) CLOSURE PANEL ARRANGEMENT

(75) Inventor: Harold G Mayes, Leicester (GB)

(73) Assignee: Rolls-Royce plc, London (GB)

( * ) Notice: Subject to any disclaimer, the term of this patent is extended or adjusted under 35 U.S.C. 154(b) by 97 days.

(21) Appl. No.: 10/919,348

(22) Filed: Aug. 17, 2004

(65) Prior Publication Data

US 2005/0056726 A1    Mar. 17, 2005

(30) Foreign Application Priority Data

Aug. 29, 2003   (GB) ................ 0320371.8

(51) Int. Cl.
    *B64C 1/16* (2006.01)
(52) U.S. Cl. .................. 244/129.5; 49/379; 244/53 B
(58) Field of Classification Search ................ 244/54, 244/53 B, 53 R, 129.5; 137/15.1; 49/379, 49/386, 394
    See application file for complete search history.

(56) References Cited

U.S. PATENT DOCUMENTS

| | | | | |
|---|---|---|---|---|
| 3,347,578 A | * | 10/1967 | Sheehan et al. | ............ 292/113 |
| 3,952,973 A | * | 4/1976 | James | .................... 244/54 |
| 4,037,809 A | * | 7/1977 | Legrand | .................... 244/54 |
| 4,044,973 A | * | 8/1977 | Moorehead | ............... 244/54 |
| 4,150,802 A | * | 4/1979 | Evelyn et al. | ............... 244/54 |
| 4,380,848 A | * | 4/1983 | Guionie et al. | ............... 16/85 |
| 4,452,015 A | * | 6/1984 | Jacques et al. | ............... 49/386 |
| 4,472,857 A | * | 9/1984 | Guionie et al. | ............... 16/341 |
| 4,473,201 A | * | 9/1984 | Barnes et al. | ............ 244/129.5 |
| 4,528,897 A | * | 7/1985 | Homolik | ...................... 454/7 |
| 4,585,189 A | * | 4/1986 | Buxton | ........................ 244/54 |
| 4,629,146 A | * | 12/1986 | Lymons | .................. 244/53 R |
| 5,046,689 A | * | 9/1991 | Shine | ..................... 244/129.4 |
| 5,090,640 A | * | 2/1992 | Fessett | ................... 244/129.5 |
| 5,251,435 A | * | 10/1993 | Pauley | ...................... 60/226.1 |
| 5,303,508 A | * | 4/1994 | Porte | ........................... 49/109 |
| 5,350,136 A | * | 9/1994 | Prosser et al. | ........... 244/129.4 |
| 5,356,264 A | * | 10/1994 | Watson et al. | .............. 415/119 |
| 5,372,338 A | * | 12/1994 | Carlin et al. | ................... 244/54 |
| 6,220,546 B1 | * | 4/2001 | Klamka et al. | .......... 244/129.4 |
| 6,227,485 B1 | * | 5/2001 | Porte | ........................... 244/54 |
| 6,308,915 B1 | * | 10/2001 | Liston et al. | .................. 244/54 |
| 6,334,730 B1 | * | 1/2002 | Porte | .......................... 403/104 |
| 6,457,674 B2 | * | 10/2002 | Erben et al. | ............. 244/129.5 |
| 6,516,606 B2 | * | 2/2003 | Fournier et al. | .............. 60/262 |

* cited by examiner

*Primary Examiner*—Timothy D. Collins
(74) *Attorney, Agent, or Firm*—W. Warren Taltavull; Manelli Denison & Selter PLLC

(57) ABSTRACT

A closure panel arrangement is provided in which a closure panel 6 can only be retained when appropriately aligned with engagement between clasp hooks 8 and pins 9 is achieved along with association between latch hooks 10 and pins 11. If there is not appropriate association and alignment then a bias 12, 22, 32, 42 creates an outward bias force upon the closure panel 6 whereby the panel 6 will continue to fall out. In such circumstances, the panel 6 cannot remain in position due to simply key fit interference/friction association of sufficient strength for non-operational conditions but which will fail during operation due to vibration or stresses.

12 Claims, 5 Drawing Sheets

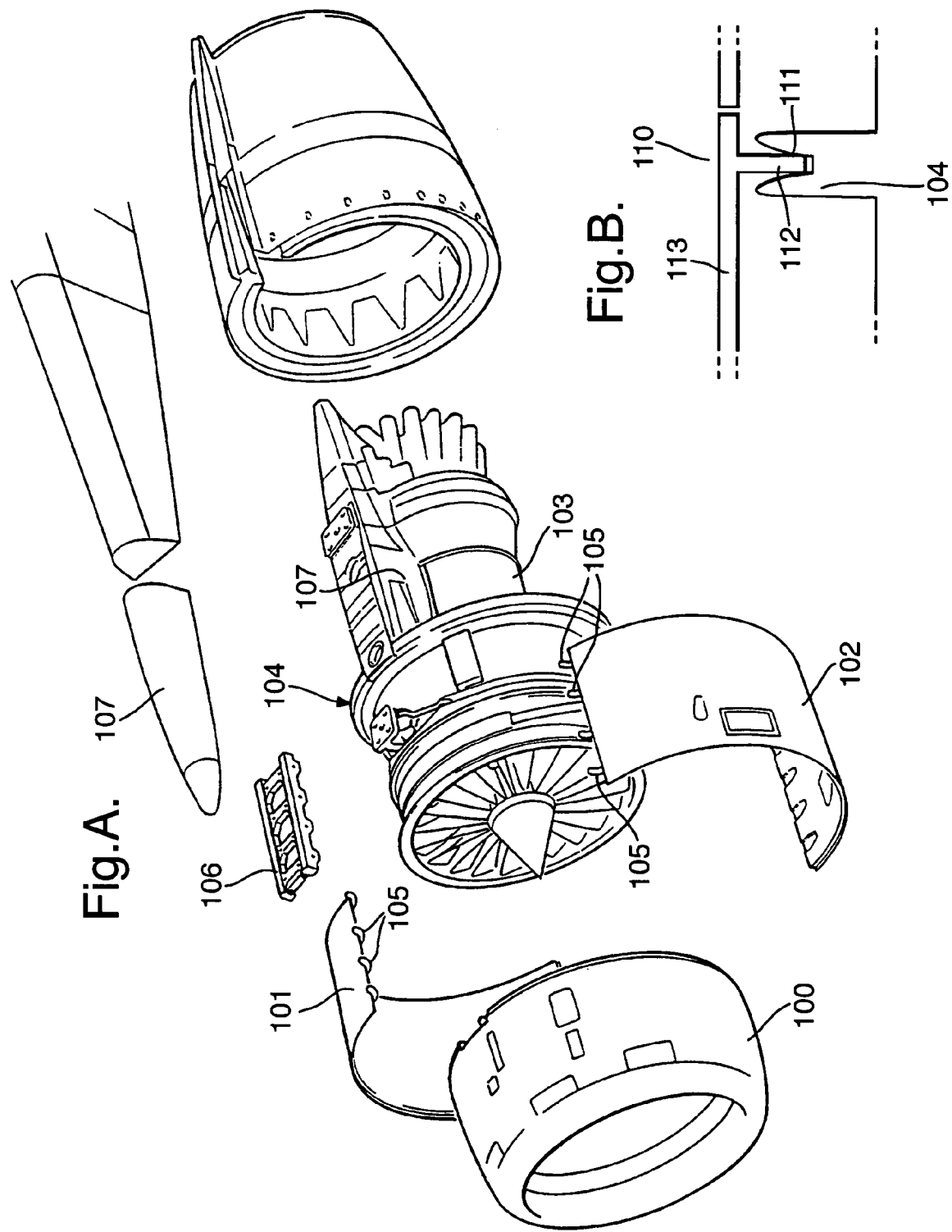

CLOSURE PANEL ARRANGEMENT

FIELD OF THE INVENTION

The present invention relates to a closure panel arrangement and more particularly to a closure panel arrangement used in fairings or cowlings of an aircraft engine or air frame.

BACKGROUND OF THE INVENTION

In order to gain access for repair and maintenance it is necessary to provide removable panels in the form of fairings or closures about engine structures or airframes. Accordingly, these panels must be easily removable, but also must be securely located whereby the panel will not become detached in use causing damage to associated engine parts or airframes, both of the aircraft upon which the panel is secure as well as other aircraft in the vicinity.

Previously, it has been known to provide hinged panels which extend from a hinge edge of an opening or gap. Thus, the panel can pivot about that hinge edge until securely located normally by an opposed latching edge of the opening or gap. Normally, the closure panel is secured about a pin with a hook like clasp or a number of such hooks extending over the pin to allow pivot thereabout. In such circumstances it is possible to remove the panel completely rather than requiring the closure panel to be propped for access.

Unfortunately, such detachment of the closure panel from the hinge edge requires upon reassembly accurate association between that hinge edge and a pivot edge of the closure panel in order to create the necessary pivot association between the pin and hook-like clasps. Sometimes this pivot association may not be appropriately formed by failure to ensure engagement between the hook-like clasps and the pin, but with limited vibration and load, the panel will remain in place. Nevertheless, when vibration and other loads are then placed upon the closure panel it may become detached with detrimental consequences.

FIGS. A and B in the attached drawings illustrate respectively an exploded representation of a typical aircraft engine propulsion system and a cowling edge seal. Referring to FIG. A, it can be seen that the engine propulsion system comprises a number of cowling panels and elements and in particular, a nose cowl 100 with side cowls 101, 102 and further cowls 103 associated with the core engine components 104. These cowls 100 to 103 cool and protect the engine core 104. The present invention is directed to cowl panels 101, 102, 103 and other cowl or fairing panels which are secured through hinge elements 105 located in a hinge support structure 106 about the core 104 or similar. Thus, as indicated above it is difficult to locate hinge elements such as elements 105 in the hinge support structure 106 which is generally located within a pylon nose cover 107. In such circumstances, an appropriate robust hinge may not be fully formed such that the panels 101, 102 may become detached in operation. This problem is further exacerbated by the use of a "V" groove circumferential seal 110 between the panels 101, 102 and reciprocal parts of the nearest cowl 100 or core 104. This "V" groove association in both the leading and trailing edges of the panels 101, 102 provides significant friction association which may retain the panel in position when not under load even when a proper hinge has not been formed between the elements 105 and support structure 106.

FIG. B provides a cross-sectional detail of such a "V" groove seal arrangement 110. Thus, a fixed rigid structure on the engine core 104 or casing 100 provides a "V" groove 111 within which an edge 112 of a panel 113 is located to form a seal. There is a friction engagement between the edge 112 and the "V" groove 111 which provides a seal but also helps grip the panel 113 in order that it is retained about the core 104 despite the lack of good association between the hinge elements 105 and the support 106.

It will be appreciated that as indicated above there are a number of fairings and cowlings within an engine system and the above description with regard to side cowls 101, 102 is merely by way of example. Thus, there will be similar problems with regard to an engine core cowl 103 in its association with a hoop plate 107.

SUMMARY OF THE INVENTION

In accordance with the present invention there is provided a closure panel arrangement for fairings or cowlings or airframes, the arrangement comprising a closure panel secured in use across an opening or a gap from a hinge edge, the closure panel initially retained about the hinge edge upon a mounting edge whereby that panel may pivot about the hinge edge until located and then secured across the opening or gap, the arrangement characterised in that the closure panel is associated with a radial outward bias to ensure only correct alignment between the hinge edge and the mounting edge will be retained upon pivot about the hinge edge for location of the closure panel across the opening or the gap.

Typically, the hinge edge and the mounting edge reciprocally co-operate with respective hook clasp and pin means associated in order to allow pivot about the hinge edge.

Normally, the closure panel is secured in place by latch means.

Preferably, the bias is centrally located between the hinge edge and mounting edge.

Normally, the bias projects from a base structure.

Typically, the bias comprises a torsion spring.

Normally, the torsion spring is in contact with the closure panel through a roller.

Generally, the torsion spring will be displaced through an angle of 90° as it presents bias to the closure panel upon pivot about the hinge edge of the opening or gap.

Alternatively, the bias may be provided by a foam or rubber insert or an inflated bag or a hydraulic compression spring or a mechanical compression spring.

Typically, the bias is secured to the closure panel and/or other parts to prevent complete fall out of the closure panel when incorrectly aligned.

Normally, the bias acts against a reinforced portion of the closure panel.

BRIEF DESCRIPTION OF THE DRAWINGS

Embodiments of the present invention will now be described by way of example and with reference to the accompanying drawings in which.

DETAILED DESCRIPTION OF THE INVENTION

Figure 1:
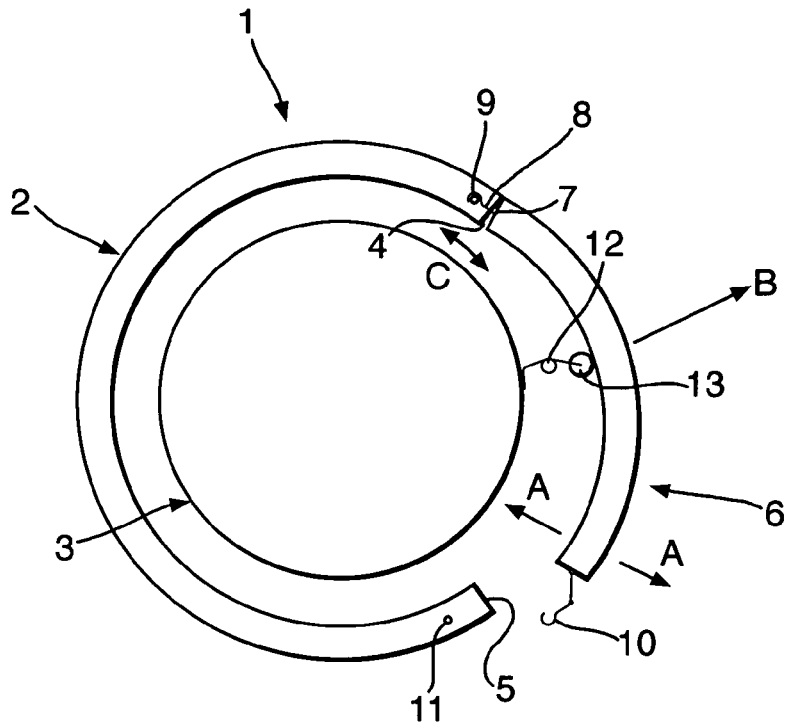
FIG. 1 is a schematic front cross section of a panel closure arrangement in accordance to the present invention upon initial association.

As indicated above there are a number of situations where it is necessary to secure a closure panel over an aperture, opening or gap particularly with regard to aircraft engines and airframes. These openings or gaps are provided in cowlings and fairings in order to allow access for maintenance and repair and possibly during initial assembly and installation. Typically these closure panels will be secured about one side whereby the panel can pivot into position and then be locked by a latch in that position. Unfortunately the latch alone or in association by friction with adjacent panels may retain position even when not properly aligned and secured when there is limited vibration or load stresses placed upon the closure arrangement. However, the panel will fall out when such loads are applied.

Pivot is generally achieved through a number of hook clasps associated with a pin. Normally, the pin is in the fixed housing structure whilst the hook clasps are located upon a hinge edge of the closure panel. It is correctly locating these clasp hooks on the pins for alignment and retention which creates difficulties. It will be understood that there is limited access and sight alignment is generally required to achieve the necessary association. Generally, as indicated, the hook clasps are intended to engage the pin along a mounting edge of an opening in a fixed structure such as a cowling or fairing, whereby the closure panel can rotate or pivot about the association between hook clasps and pin into a closed position. At the opposite side of the closure panel a number of latches will be provided. These latches engage a further set of pins in order to exert a tensile or load which retains the closure panel in position. As a result of such hoop or tensile association along with the friction grip of the "V" groove described above association it would be appreciated that the closure panel may be retained even though the latches and hook clasps are not properly positioned.

FIGS. 1 to 4 illustrate a first embodiment of the present invention. Thus, a closure panel arrangement 1 comprises a substantially fixed fairing or cowling 2, such as that around an engine structure 3, with an opening defined between a hinge edge 4 and a latch edge 5. A closure panel 6 extends across the opening in normal use. Typically, the cowling or fairing 2 will have displaceable closure panels on either side of the engine structure 3 but for clarity only one such closure panel 6 is depicted in FIGS. 1 to 4.

As can be seen the closure panel 6 at a mounting end 7 incorporates a number of hook clasps 8. These clasps 8 engage and are retained upon a pin or pins 9 along the hinge edge 4. Thus, the panel 6 can rotate or pivot about that pin 9 in the direction of arrowheads A. The other end of the closure panel 6 is brought into engagement with the mounting end 5. A number of latch hooks 10 extend over the latch pins 11 in order to create the tensile or hoop load, as described previously, when the closure panel 6 is correctly aligned and positioned relative to the fixed fairing or cowling 2.

Figure 2:
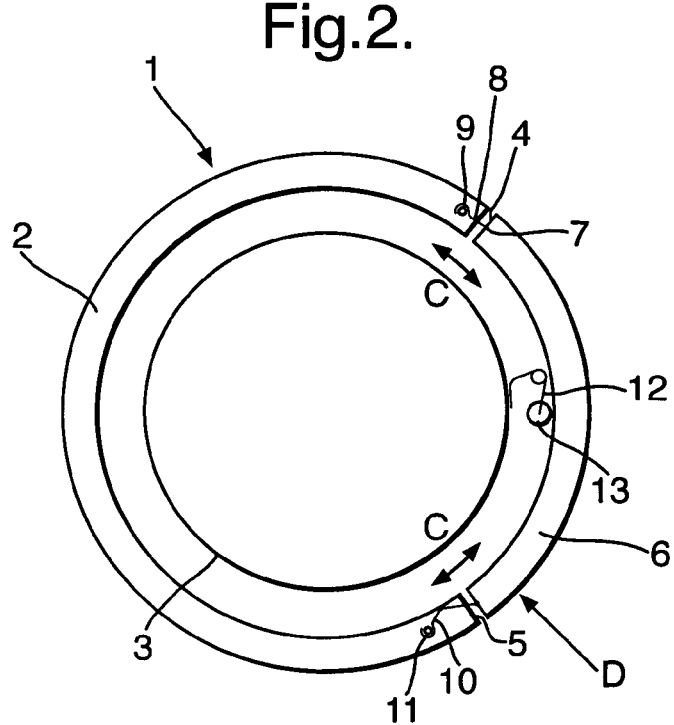
FIG. 2 is a schematic front cross section of the arrangement depicted in FIG. 1 in a closed configuration.

FIGS. 1 and 2 illustrate the present closure panel arrangement when there is correct alignment of the closure panel for robust retention in use, that is to say resistant to operational stress loads and vibration.

FIG. 1 illustrates the arrangement upon initial assembly with FIG. 2 illustrating the arrangement when closed. As indicated above, if the hook clasps 8 are correctly associated and aligned with the hinge pins 9 and the latch hooks 10 are correctly aligned with the latch pins 11 then there will be good retention of the closure panel 6 relative to the fairing or cowling 2. Unfortunately, correct positioning of the hook clasps 8 relative to the hinge pins 9 is difficult due to their position at a recessed location within the hinge edge 4 so that manipulation by sight inspections is difficult into the correct orientation.

In accordance with the present invention, a bias 12 is provided which extends from the relatively stable engine structure 3. This bias 12 is presented radially and outwardly underneath the closure panel 6. Thus, a bias force in the direction of arrowhead B is created by the bias 12. As illustrated, typically this bias 12 takes the form of a torsion spring with a roller 13 at the engagement end with the closure panel 6. The roller 13 limits friction and spreads applied bias load. Typically, the closure panel 6 will also be reinforced at those parts subject to bias load to prevent damage and distortion.

As indicated above, the pairings of clasp hooks 8 and pins 9 along with latch hooks 10 and latch pins 11 provide radial or hoop retention of the closure panel 6, that is to say retention principally in the direction of arrowhead C with outward displacement resistance of the closure panel 6 dependent upon the hook overlap upon the respective pins 9, 11. In such circumstances upon initial assembly, if the clasp hooks 8 are not appropriately and accurately aligned upon the pins 9 then the outward bias provided by the torsion spring 12 will not be resisted and the panel 6 not retained, even though there may be some key fit/friction association between the panel 6 within the opening of the fairing or cowling 2, for example due to V-groove friction grip association. The bias 12 ensures that only with appropriate association between the clasp hooks 8 and the pins 9 and subsequently between the latch hooks 10 and pins 11 will the closure panel 6 remain in place. The bias 12 ensures that the panel 6 will not remain in place merely due to key fit association between the panel 6 within the gap formed in the fairing 2 when there is limited operational stressing or vibration.

A roller 13 as indicated above is provided in order to reduce friction and spread bias load applied to the closure panel 6. The bias 12 as indicated is normally in the form of a torsion spring. This spring is generally located centrally or midway between the extremities of the opening, that is to say between the hinge edge 4 and the latch edge 5. Normally, to minimise in use the size of the bias spring 12 and roller 13 they will be displaced through an angle of 90° from an initial free uncompressed state to a compressed state with the closure panel 6 in position and retained by latching of the hooks 10 upon the pins 11 as well as retention of the hinge formed between the clasp hooks 8 and the pins 9. In short, the bias in terms of the length of the spring is such that in its free state the roller 13 will displace the closure panel 6 to such an extent that the key fit or interference friction between the closure panel 6 and the fairing or cowling 2 is insufficient to retain that panel 6 in position if the hooks 8, 10 and pins 9, 11 are not properly engaged.

Figure 3:
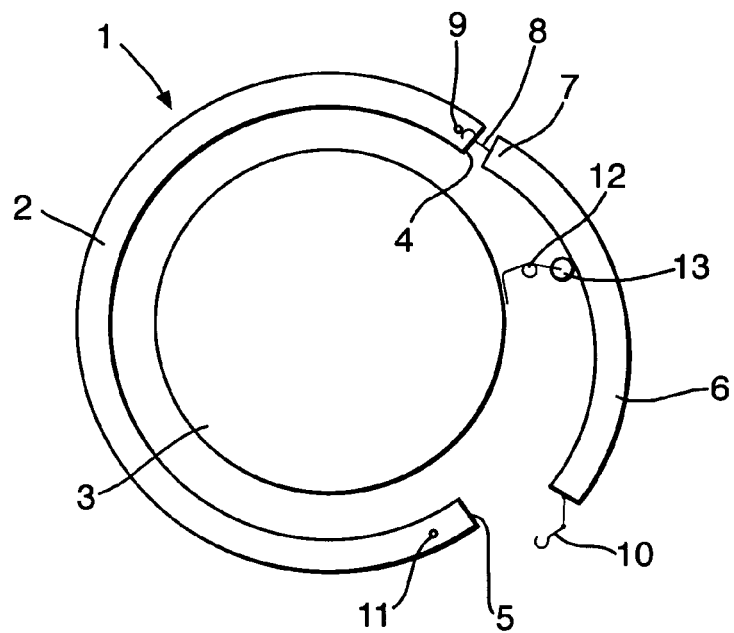
FIG. 3 is a schematic front cross section of the arrangement depicted in FIGS. 1 and 2 upon initial assembly but with misalignment between the closure panel and the opening or gap.
Figure 4:
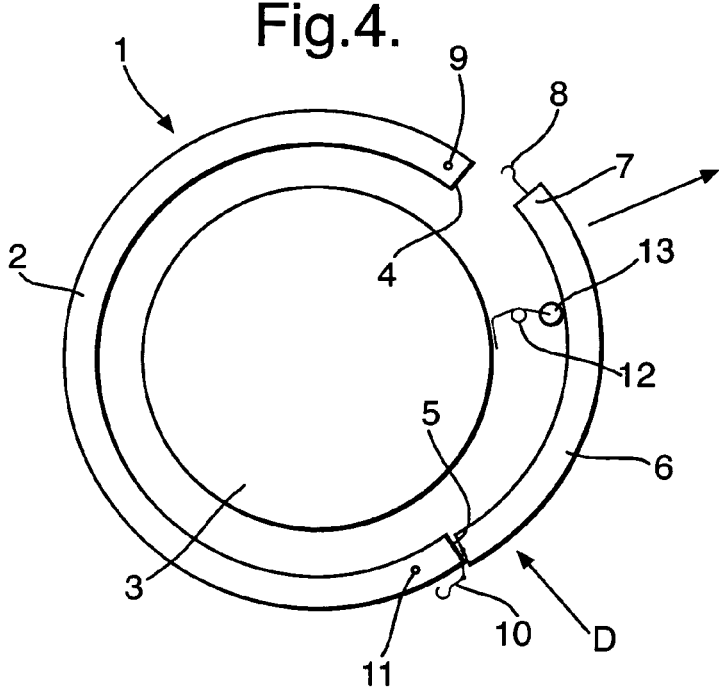
FIG. 4 is a schematic front cross section of the arrangement depicted in FIG. 3 upon attempting to pivot the closure panel across the opening or gap.

By appropriate choice of bias and closure panel 6 geometry, it will be understood that the magnitude of bias force typically provided will be easily overcome by displacing the panel 6 in the direction of arrowhead D in order to close the opening with the panel 6 extending across from the hinge edge 4 to the latch edge 5. However, as illustrated in FIGS. 3 and 4 if initially the hook clasps 8 are not properly engaged upon the pins 9 then the reaction of the bias 12 when a closing action in the direction of arrowhead D is presented will be to cause the closure panel 6 to rotate about the roller 13 and so fall out of engagement. In such circumstances, the closure panel 6 will only be retained within the arrangement if there is appropriate association between the hook clasps 8 and pins 9, and subsequently between the latch hooks 10 and the pins 11. If there is no such alignment and retention then the closure panel 6 will continue to fall out of position.

Figure 5:
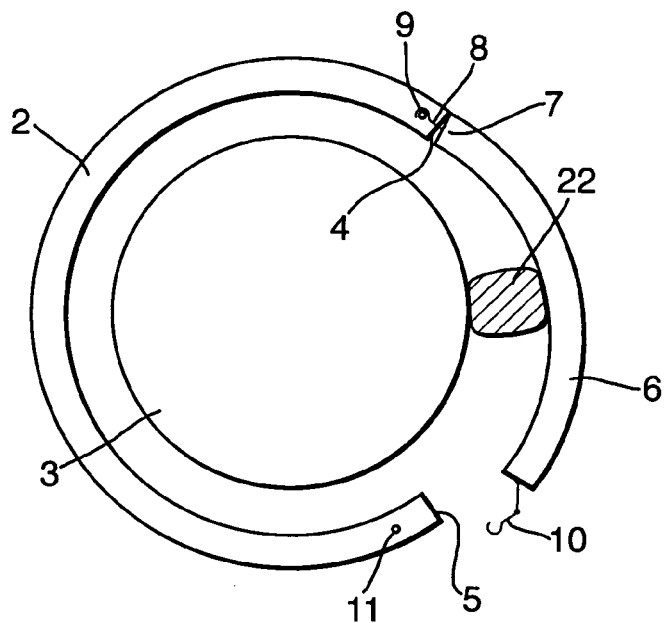
FIG. 5 is a schematic front cross-section of an arrangement in accordance with the present invention in which the bias is provided by a foam insert.

As earlier described with regard to FIG. 1, bias 12 is normally in the form of a torsion spring, it will be appreciated that other arrangements could be provided in which there are more than one bias spring or different forms of bias. Thus, as illustrated in FIG. 5 a compressed foam or rubber insert 22 may be provided in order to create the outward bias necessary to ensure only appropriate association between the clasp hooks 8 with the pins 9 and latch hooks 10 with latch pins 11 ensures appropriate retention of the closure panel 6. The insert 22 is deformed under compression as the closure panel 6 is rotated about the hinge end 4 and this compression of the insert 22 creates an outward bias as described previously by shape memory, that is to say a desire to return to its unbiased or free state.

Figure 6:
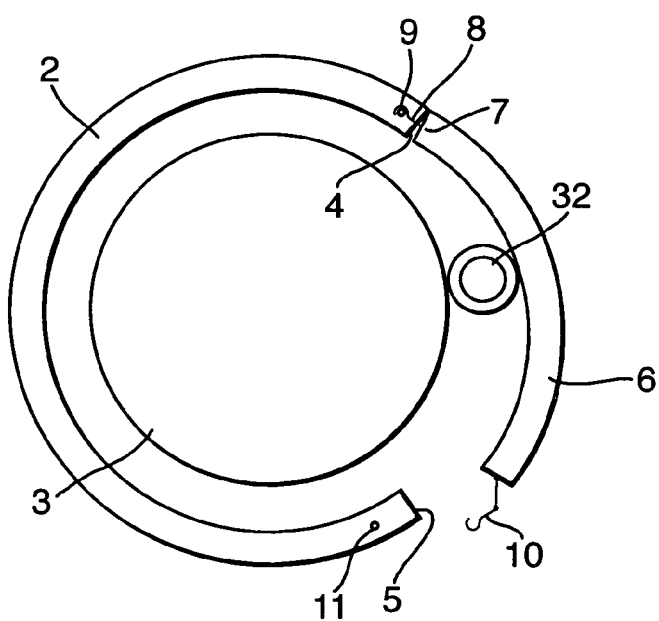
FIG. 6 is a schematic front cross section illustrating an embodiment of the present invention in which the bias is provided by an inflated pressurised bag; and, FIG. 7 is a schematic front cross section of an arrangement in accordance with the present invention in which the bias is provided by a mechanical or hydraulic compression spring.

FIG. 6 illustrates a further embodiment of the present invention in which a bag or bladder is pressurised in order to create the outward bias necessary to ensure that only by correct association between the hook clasps 8 with pins 9 and lock hooks 10 with lock pins 11 will result in retention of the closure panel 6. The size and resistance to deformation of the bag 32, as with the insert 22 (FIG. 5), will be dependent upon the desired bias force and necessary distribution of bias load upon the closure panel 6 to avoid distortion and damage. It will also be understood that the insert 22 or bag 32 may not require the use of a roller in order to accommodate for the rotational movement of the closure panel 6 but will generally require greater space for accommodation between the engine structure 3 and the closure panel 6. An insert 22 or bag 32 may also be more susceptible to environmental temperature changes and pressure variations, particularly when used within an aircraft engine or airframe.

Figure 7:
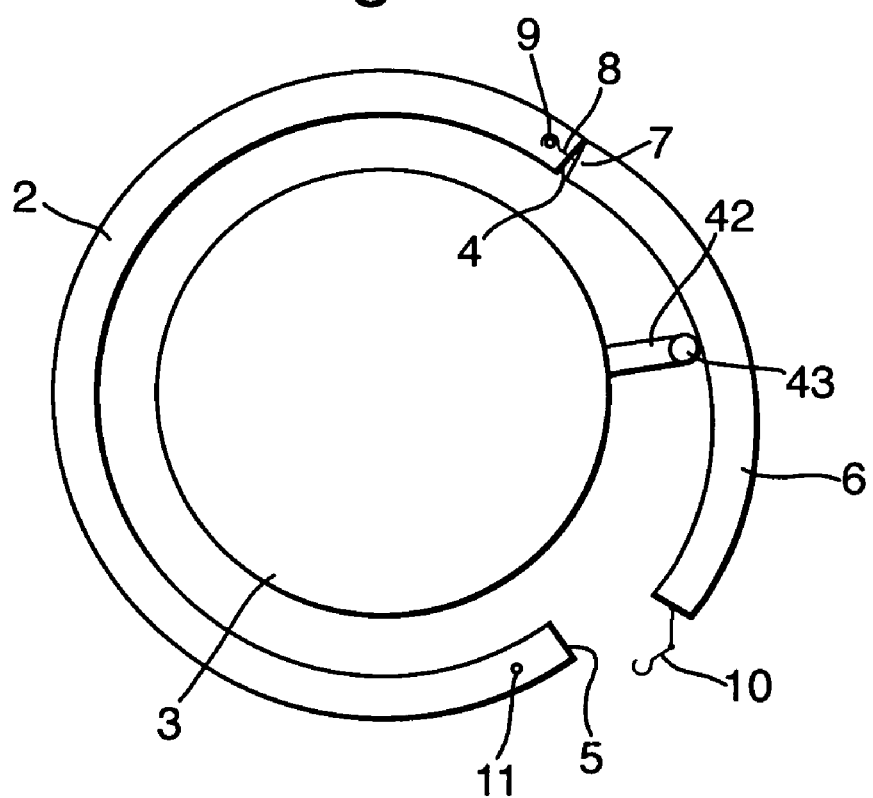

FIG. 7 illustrates a further embodiment of the present invention in which a mechanical or hydraulic compression spring is utilised in order to provide the bias 42 necessary to ensure only by appropriate combination of clasp hooks with pins and lock pins with lock hooks retains the closure panel relative to the substantially fixed cowling or fairing 2. As will be appreciated a typical mechanical compression spring comprises a wound helix of sprung steel whilst a hydraulic compression spring comprises a piston within a cylinder whereby an enclosed volume is compressed in order to create a return bias outwardly in accordance with the present invention. In a similar fashion to that described with regard to the preferred embodiment depicted in FIGS. 1 to 4 such a mechanical or hydraulic compression spring generally requires a roller 43 in order to distribute applied bias load as well as accommodate rotation of the closure panel 6 into the desired closed orientation as it pivots and is then retained relative to the fixed cowling or fairings 2.

Normally, the bias in accordance with the present invention will be secured to the relatively stable engine structure or other base structure as an anchor from which it projects. It will also be understood that it is possible to secure the bias to the closure panel where possible with bias contact then made with the stable or base structure as required.

As indicated above typically the closure panel 6 will fall out unless there is appropriate location between the pins and associated hook clasps and lock hooks. In such circumstances in order to prevent damage by falling upon a hard surface the closure panel may be additionally secured through a guard chain or other device including securing the bias both to the base structure and the closure panel to prevent such falling upon hard surfaces. Nevertheless, it will be appreciated that typically the closure panel 6 will be hand manipulated by appropriate personnel such that the panel 6 will be held until maintained by a correct orientation and assembly between the pins and hooks.

Although described with respect to an engine cowling used in an aircraft it will be appreciated that the present closure panel arrangement could be utilised in a range of situations where it is necessary to ensure appropriate location of that panel but where although it would appear correctly located through friction association the panel is not correctly assembled and it will fall out under operational vibration or stress loads.

As indicated above, normally the closure panel will be reinforced to prevent damage due to application of the bias force. Where possible the bias force may be removed when correct assembly, that is to say engagement between hooks and pins, is confirmed by the closure panel being retained whilst the bias force is operational.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A closure panel arrangement for fairings or cowlings or airframes, the arrangement comprising a closure panel secured in use across an opening from hinge edges located on opposite sides of said opening, the closure panel initially retained about each hinge edge upon a mounting edge whereby that panel may pivot about each hinge edge until located and then secured by securing means across the opening, the arrangement characterised in that the closure panel is associated with a radial outward bias member, arranged to bias the panel in an opposite direction to its closure, to ensure, if the panel is not secured properly, the panel will fall out of position, said radial outward bias member being located substantially intermediate said hinge edges.

2. An arrangement as claimed in claim 1 wherein, the hinge edge and the mounting edge reciprocally co-operate with respective hook clasp and pin means associated in order to allow pivot about the hinge edge.

3. An arrangement as claimed in claim 1 wherein the closure panel is secured in place by latch means.

4. An arrangement as claimed in claim 1 wherein the bias is centrally located between the hinge edge and mounting edge.

5. An arrangement as claimed in claim 1 wherein the bias projects from a base structure.

6. A closure panel arrangement for fairings or cowlings or airframes, the arrangement comprising a closure panel secured in use across an opening from a pair of spaced apart hinge edges, the closure panel initially retained about said hinge edges upon mounting edges whereby that panel may pivot about said hinge edges until located and then secured by securing means across the opening gap, the arrangement characterised in that the closure panel is associated with a radial outward bias, arranged to bias the panel in an opposite direction to its closure, to ensure if the panel is not secured properly the panel will fall out of position wherein the bias comprises a torsion spring located at an intermediate position between said hinge edges.

7. An arrangement as claimed in claim 6 wherein the torsion spring is in contact with the closure panel through a roller.

8. An arrangement as claimed in claim 6 wherein the torsion spring will be displaced through an angle of 90° as it presents bias to the closure panel upon pivot about the hinge edge of the opening or gap.

9. An arrangement as claimed in claim 1 wherein the bias may be provided by a foam or rubber insert or an inflated bag or a hydraulic compression spring or a mechanical compression spring.

10. An arrangement as claimed in claim 1 wherein the bias is secured to the closure panel and/or other parts to prevent complete fall away of the closure panel when incorrectly aligned.

11. An arrangement as claimed in claim 1 wherein the bias acts against a reinforced portion of the closure panel.

12. An arrangement as claimed in claim 1 wherein the bias is removable after correct alignment is achieved with that bias present.

* * * * *